United States Patent
Zhu et al.

(10) Patent No.: US 9,614,789 B2
(45) Date of Patent: Apr. 4, 2017

(54) SUPPORTING MULTIPLE VIRTUAL SWITCHES ON A SINGLE HOST

(71) Applicant: Futurewei Technologies, Inc., Plano, TX (US)

(72) Inventors: Xiaogang Zhu, San Jose, CA (US); Arularasi Sivasankaran, Santa Clara, CA (US); Jiafeng Zhu, San Ramon, CA (US); Liufei Wen, Shenzhen (CN); Yanlan Wei, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 111 days.

(21) Appl. No.: 14/592,523

(22) Filed: Jan. 8, 2015

(65) Prior Publication Data

US 2016/0205048 A1    Jul. 14, 2016

(51) Int. Cl.
| | |
|---|---|
| *H04L 12/28* | (2006.01) |
| *H04L 12/931* | (2013.01) |
| *H04L 12/721* | (2013.01) |
| *H04L 12/803* | (2013.01) |
| *G06F 9/455* | (2006.01) |
| *H04L 12/715* | (2013.01) |

(52) U.S. Cl.
CPC .............. *H04L 49/70* (2013.01); *H04L 45/38* (2013.01); *H04L 47/125* (2013.01); *G06F 2009/4557* (2013.01); *H04L 45/64* (2013.01); *H04L 49/501* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,717,895 | B2 * | 5/2014 | Koponen | H04L 12/4633 370/235 |
| 9,001,827 | B2 * | 4/2015 | Appenzeller | H04L 45/54 370/392 |
| 2011/0176428 | A1 * | 7/2011 | Ballard | B60R 16/03 370/241 |
| 2014/0064283 | A1 * | 3/2014 | Balus | H04L 49/70 370/392 |
| 2015/0010000 | A1 * | 1/2015 | Zhang | H04L 45/38 370/392 |
| 2015/0180769 | A1 * | 6/2015 | Wang | H04L 45/38 370/236 |

* cited by examiner

*Primary Examiner* — Frank Duong
(74) *Attorney, Agent, or Firm* — Schwegman Lundberg & Woessner, P.A.

(57) ABSTRACT

System and method for supporting multiple vSwitches on a single host server. In one aspect, embodiments according to the present disclosure include a system and method for supporting multiple vSwitches on a single host server. In one aspect, a set of packet processor threads are instantiated to process data packets on behalf of all vSwitches deployed on the host server. For a data packet received at a port of the host server, a packet processor determines the datapath based on a mapping table and processes the packet according to the rules defined for that datapath. In one aspect, ports (physical and/or virtual) are able to be configured to specified vSwitches dynamically.

20 Claims, 11 Drawing Sheets

```
router (config)# datapath add dp1 0x11
router (config)# datapath add dp2 0x12
router (config)# show datapath
_____
        Datapath
Index   name        id
_____
0       default     0x000000005156
1       dp1         0x000000000011
2       dp2         0x000000000012
```

502 points to Index; 504 points to Datapath name; 506 points to id.

Figure 5

```
router (config)# port create virtual switch lport1
router (config)# port create virtual switch lport2
router (config)# show port
_____
        Port                        Datapath
Index   name    type    peer-id     index    name       id
_____
0       tap:    Local   N/A
1       eth2    Eth     N/A
2       eth3    Eth     N/A
3       eth4    Eth     N/A
4       eth5    Eth     N/A
5       lport1  Switch  N/A
6       lport2  Switch  N/A
```

602 → Index; 604 → Port name; 606 → type; 608 → peer-id; 502 → Datapath index; 504 → name; 506 → id.

Figure 6

SUPPORTING MULTIPLE VIRTUAL SWITCHES ON A SINGLE HOST

FIELD OF THE INVENTION

The present disclosure relates generally to the field of software-defined networks (SDN), and more specifically, to the field of virtual switch (vSwitch) management in an SDN.

BACKGROUND OF THE INVENTION

As servers become more and more powerful, it becomes ever easier to deploy multiple virtual machines (VMs) on one hardware server (e.g., a host server) for an SDN. In this manner one server can represent, from a user perspective, multiple servers (e.g., many virtual servers). When multiple VMs are deployed, connections between the VMs and the physical interfaces of the host server are configured using software switches—for example, vSwitches. vSwitches can be used for forwarding data packets between VMs and the physical interfaces. If only a few VMs are deployed, a single vSwitch may be sufficient to handle traffic amongst the VMs and the physical interfaces. However, when many VMs are present, multiple vSwitches may likewise be required. In such scenarios, VMs may be grouped by vSwitches according to functionality of the applications provided on the VMs.

For improvements in organization and ease of access to application(s) running on the VMs of the virtual network, deploying several vSwitches may be useful for a data center network administrator. General requirements for multiple vSwitches running on a host server include: ease of connection to the interfaces of different VMs; independent configuration of each vSwitch; and simple and flexible system resource management, including CPU resource, physical interfaces, memory, and other hardware allocation. Each vSwitch requires allocation of some physical system resources, the ability to control this allocation being of particular importance. In particular, resource competition amongst vSwitches must be considered, as well as competition with system applications. A vSwitch is able to process a packet received from a VM, another vSwitch, or a network (through a physical interface of the host server). For some situations, multiple vSwitches may be grouped together in some particular topology to act in concert, and therefore vSwitches require the capability of data forwarding with each other.

Current attempts to deploy software as a vSwitch require discrete data tables (e.g., OpenFlow tables) to dictate the data forwarding rules that will be followed for that particular vSwitch, including forwarding, packet processing, and any changes to be made to a packet. A packet processor is likewise configured for each vSwitch, which is often a CPU core dedicated to the vSwitch. Further, a protocol is necessary to run between the vSwitch and the controller. In contrast to a traditional switch, where the control plane is contained within the switch, the control plane of an SDN switch is located outside the switch—that is, the main network intelligence resides on a central controller running outside of the switch, and on a different server from the host. In this manner one controller is able to configure and manage multiple SDN switches, which are passive (e.g., do not require on-board network intelligence).

Deploying multiple vSwitches is growing increasingly common for accessing a multitude of VMs on a data center server. For cloud networking development, multiple vSwitches are necessary for accessing multiple VMs on a single host. Generally, as more VMs and vSwitches are introduced on a single host, greater system resources must be allocated, such as the number of CPU cores and the system memory. Conventionally, each vSwitch is instantiated as a unique software application in the host server (e.g., as a unique application), and requires dedicated CPU resources and system memory. Therefore as the number of vSwitches increases on the host server, the competition for system resources likewise increases. This increasing competition for system resources complicates system resource management, making the task of the network administrator more difficult when provisioning system resources.

Generally, the number of vSwitches on a host is limited by the number of CPU cores on the host. For example, if a vSwitch requires allocation of at least one CPU core for packet processing, the number of vSwitches that can be supported on a host will be less than the total number of CPU cores on the host. Therefore, system performance and efficiency may be greatly impacted even if the total traffic of data packets on the system is low, as CPU cores are requisitioned exclusively for independent vSwitches.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one aspect, embodiments according to the present disclosure include a system and method for supporting multiple vSwitches on a single host server. In one aspect, a set of packet processing threads are instantiated to process data packets on behalf of all vSwitches deployed on the host server. For a data packet received at a port of the host server, a packet processing thread determines the datapath based on a mapping table and processes the packet according to the rules defined for that datapath. In one aspect, ports (physical and/or virtual) are able to be configured to specified vSwitches dynamically. That is, during runtime a port may be assigned to a vSwitch or removed from a first vSwitch and assigned to a second vSwitch.

More specifically, an aspect of the present disclosure provides an apparatus including a user interface that is configured to receive instructions for generating a vSwitch application, a memory in communication with the user interface and configured to store the instructions, and a processor in communication with the user interface and the memory and configured to execute the instructions. The instructions cause the processor to generate the vSwitch application, the vSwitch application including a plurality of vSwitches, each vSwitch implementing a flow table and a protocol. The instructions cause the processor to allocate a set of packet processing threads for the vSwitch application, the set of packet processing threads are able to process data packets on behalf of all vSwitches generated under the same vSwitch application hosted on the apparatus. The apparatus is able to include a number of ports, and, via configuration instructions received at a port, the vSwitch application can be managed. The management can include associating (or removing) a port to a vSwitch, as well as adding additional vSwitches and/or logical ports.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying drawing figures in which like reference characters designate like elements and in which:

FIG. 5 depicts a command instruction for generating a new datapath, in accordance with an embodiment of the present disclosure.

FIG. 6 depicts a command instruction for generating a new virtual port (e.g., logical port) in a port mapping table, in accordance with an embodiment of the present disclosure.

DETAILED DESCRIPTION OF THE INVENTION

Figure 1:
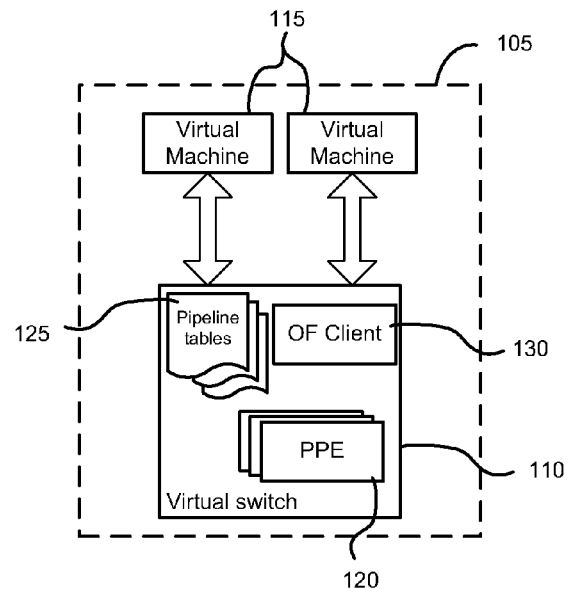
FIG. 1 is a block diagram depicting a single vSwitch deployed on a single host.

In one aspect, embodiments according to the present disclosure improve the utilization of CPU resources with regard to data packet processing on a host server, by combining processing power across multiple vSwitches. Processing power is shared across vSwitches by using one set of Packet Processing Engine (PPE) threads for a single vSwitch application that supports multiple vSwitches, such that the host server CPU is enabled to load balance the vSwitches. For example, in order to maximize resource allocation, PPE threads can be dynamically allocated amongst vSwitches according to network traffic received at the vSwitches. Further, changes may be made to CPU resource allocation, via adding (or removing) PPE threads to optimize host server resource utilization.

According to embodiments of the present disclosure, generating (or deploying) an additional vSwitch in a host is not limited by a total number CPU resources (e.g., CPU cores)—rather, only additional memory is required. Specifically, additional memory may be required for adding forwarding tables (e.g., OpenFlow tables) and a protocol thread for each additional vSwitch, but no further programming memory is required because all of the deployed vSwitches are managed by one vSwitch application. In this manner system resource management and allocation are made both easier and more flexible for a network administrator. As a non-limiting example, connections (both physical and logical) between a vSwitch and a VM, or between one vSwitch to another, can be easily reconfigured during run-time.

Further, simplification is made of memory sharing between vSwitches for packet forwarding purposes. Conventionally, if two processes share data stored in memory at a particular address, that specific memory address needs to be available to both processes. According to embodiments of the present disclosure, all vSwitches are deployed under the same vSwitch application, and therefore memory that is allocated for the vSwitch application can simply be shared by all vSwitches. Therefore, only the pointer need be provided for the memory location in order to avoid unnecessary memory copy.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present claimed subject matter, discussions utilizing terms such as "storing," "creating," "protecting," "receiving," "encrypting," "decrypting," "destroying," or the like, refer to the action and processes of a computer system or integrated circuit, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

Embodiments of the present disclosure pertain to systems and methods for supporting multiple vSwitches on a single host server. In one aspect, a set of PPE threads to process data packets on a host server is configured for sharing by all vSwitches deployed in the host server. In one aspect, data packet processing includes determining to which vSwitch (e.g., datapath) a port receiving a data packet is assigned, and processing the data packet through the pipeline of the assigned vSwitch. Herein, a "packet" may refer to an Ethernet frame, which includes a header and a payload: A "pipeline" refers to a set of pipeline tables (e.g., OpenFlow tables) that provide matching, forwarding, and modifications for the received packets in a vSwitch: A "port" describes where data packets enter and exit a pipeline, and may refer to either a physical port or a virtual logical port defined for a vSwitch. Also, ports (physical and/or virtual) can be configured dynamically, that is, during runtime a port may be assigned to a vSwitch, or removed from one vSwitch and assigned to another vSwitch.

FIG. 1 is a block diagram depicting a single vSwitch application (vSwitch) 110 deployed on a host server 105, according to conventional attempts of deploying a virtual network. The host server 105 includes several virtual machines (VMs) 115. The vSwitch application 110 includes a set of pipeline tables (e.g., OpenFlow tables) 125, a protocol (e.g., OpenFlow client) 130 that is responsible for communication between the vSwitch and a remote controller, and one or more Packet Processing Engines (PPEs) 120. A set of PPEs 120 is included on a single virtual switch application. If multiple PPEs are configured, parallel processing of data packets is possible for the vSwitch application 110. Host servers of the present day may have multiple CPUs with multiple CPU cores, which provide high processing capabilities. In order to maximize the packet processing performance, each PPE 120 thread needs to occupy a CPU core processing capability, as fully as possible.

Figure 2:
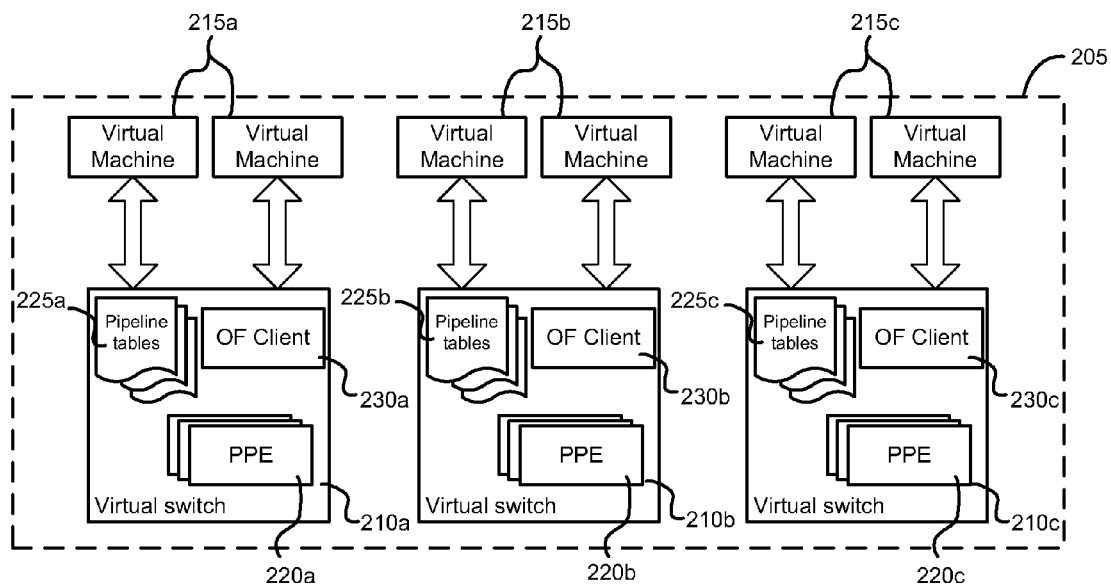
FIG. 2 is a block diagram depicting multiple vSwitches deployed on a single host.

FIG. 2 is a block diagram depicting multiple vSwitch applications (vSwitches) 210a-210c deployed on a host server 205. The host server 205 includes a number of virtual machines 215a-215c, which are connected to the vSwitches 210a-210c. Each of vSwitches 210a-210c includes a respective set of pipeline tables 225a-225c. While the multiple vSwitches 210a-210c are able to connect to different VMs, each vSwitch application in a conventional system needs to allocate its resources of the host server, such as CPU core(s) and memory resources. Therefore, vSwitch 210a has PPE 220a, vSwitch 210b has PPE 220b, vSwitch 210c has PPE 220c, and so on. Further, each vSwitch 210a-210c has its own OpenFlow client 230a-230c, and pipeline tables 225a-225c.

Independent allocation of system resources for each vSwitch in a conventional host server may result in inefficiencies and reductions in system performance. For example, assume both vSwitch 210a and vSwitch 210b require two processor cores for operation. If the host server has sufficient CPU cores, this allocation can be accommodated simultaneously for the vSwitches. If however the server has fewer than four CPU cores, insufficient CPU resources would be present for the host server and deployment of multiple vSwitches on the host server would fail. An increased communication with system scheduling is required in such a scenario, with an increased likelihood of system interrupt during packet processing operations. This represents a cost to the overall performance of the system.

Sharing server host memory is one approach to improving overall system performance. Using shared memory between the multiple vSwitch applications 210a-210c in the host server 205 enables transfer of data packets between vSwitches 210a-210c without copying the data at the sending vSwitch onto the receiving vSwitch—however, memory sharing between multiple applications of the host server 205 is difficult.

Further, multiple vSwitches configured for a host server according to conventional systems require independent resource management for each vSwitch—for example, identification of which physical ports are assigned to certain vSwitches, and which logical ports of certain vSwitches are connected to certain. It is the task of the network administrator to configure the vSwitches 210a-210c in such a way that conflicts between the vSwitches do not arise, for example, a conflict in physical port allocation. The vSwitches may have no knowledge of the network topology, or of the configuration of any neighboring vSwitches, and therefore are not enabled to resolve conflicts autonomously. Further, the network administrator must configure the addition of new ports for each vSwitch in such a manner that conflicts do not arise. This can be a time-consuming process, with the potential for improper configuration due to human errors.

For the host server 205 depicted in FIG. 2, there is an increasingly intractable problem for a virtual network system that continues to add vSwitches. Since each vSwitch requires independent data packet processor(s), the number of CPU cores of the host server must be greater in order to accommodate a greater number of vSwitches or conflicts over CPU resources will occur.

Exemplary Host Server Supporting Multiple vSwitches

Figure 3:
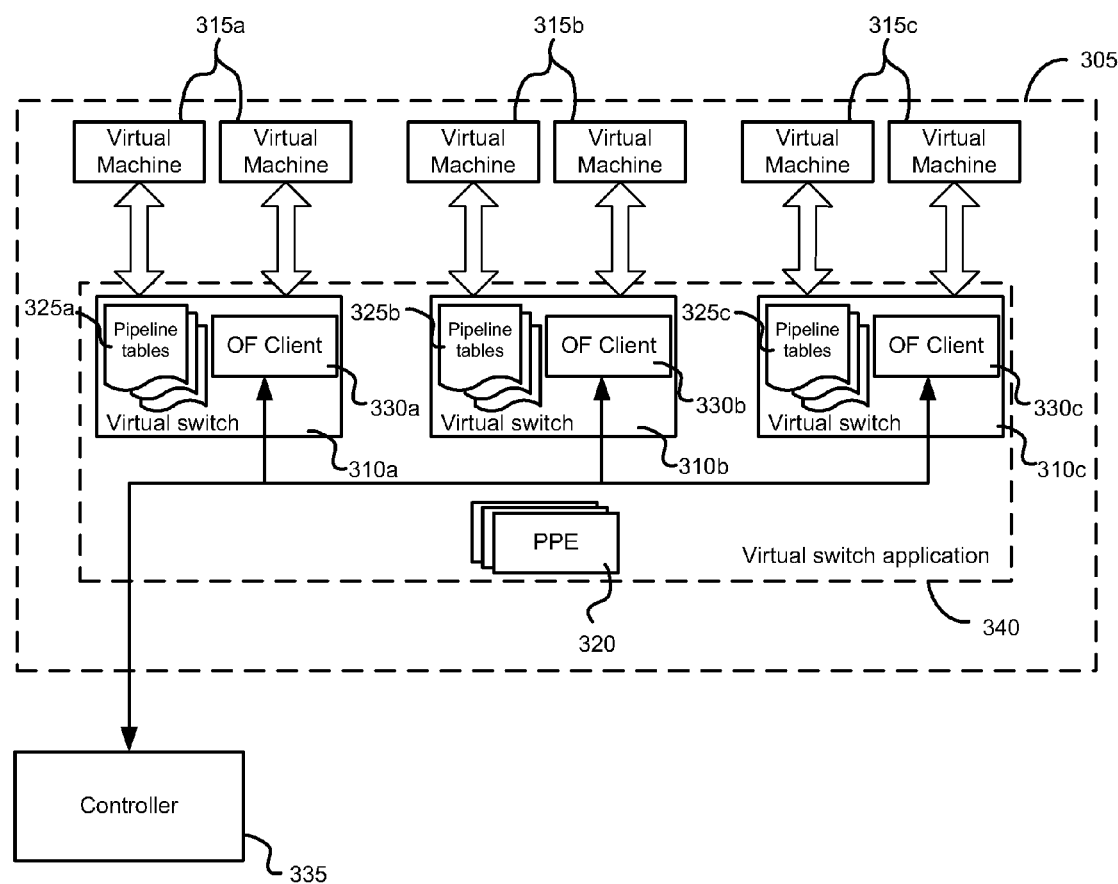
FIG. 3 is a block diagram depicting exemplary multiple vSwitches in accordance with an embodiment of the present disclosure.

FIG. 3 is a block diagram depicting a host server 305 having a plurality of virtual machines 315a-315c and exemplary multiple vSwitches 310a-310c in accordance with an embodiment of the present disclosure. In contrast to conventional approaches, each vSwitch 310a-310c does not have its own independent PPE. Rather, according to embodiments of the present disclosures a set of PPE threads is instantiated for all vSwitches via PPE 320, which is deployed in a single vSwitch application 340 on the host server 305. The vSwitch application 340 can be instantiated via a user interface of the host server 305—for example, via a user interface, or other programmatic interface. The packet processing functionality is decoupled from the control tables (e.g., pipeline tables 325a-325c) of each individual vSwitch, by the PPE 320 associated with the vSwitch application 340 that implements the multiple vSwitches 310a-310c. Each vSwitch includes a set of pipeline tables 325 and a communication protocol (e.g., OpenFlow client) 330 (e.g., pipeline tables 325a-325c and OpenFlow clients 330a-330c for vSwitches 310a-310c, respectively). A controller 335 is connected to the Open Flow clients 330a-330c of each vSwitch in order to configure the pipeline tables 325a-325c of a vSwitch 310a-310c).

The PPE 320 (e.g., set of packet processing threads) is responsible for packet processing for all vSwitches 310a-310c, rather than an independent packet processor being allocated for each vSwitch. According to embodiments of the present disclosure, regardless of the number of vSwitches deployed on the host server 305, the PPE 320 retains the initial share allocated of host server resources (e.g., CPU cores). Stated another way, since the packet processing is decoupled from individual vSwitches, vSwitches may be added (or removed) without change to the CPU resources allocation of the host. This is in contrast with conventional attempts to deploy multiple vSwitches, where each vSwitch is configured to reserve additional CPU resources (e.g., systems according to FIGS. 1-2). The shared processing threads of PPE 320 enables load balancing for packet processing amongst the vSwitches 310a-310c on the host server 305. In an embodiment, the PPE 320 is able to automatically load balance by processing in parallel data packets for all ports configured to respective vSwitches, based on network traffic loads. According to an embodiment of the present disclosure, the number of PPE threads allocated to PPE 320 may be changed (e.g., threads may be added, or removed) in order to optimize host server resource allocation.

While the PPE 320 is decoupled from individual vSwitches, embodiments according to the present disclosure maintain an independent vSwitch view in the host server 305, that is, each vSwitch has its own Pipeline tables, including flow tables, meter table, group table, port table, etc.). In this manner, each vSwitch is represented by a set of Pipeline tables, along with an OF client to maintain the connection between the vSwitch and the controller. That is, each vSwitch communicates with controller 335 independently, so from the controller point of view, the topology of the network is not changed—discrete vSwitch 310a—vSwitch 310c remain the same. However, from the application perspective, a reduction is made from three vSwitch applications down to one application, and the number of required PPEs in a conventional system reduced from three to one. As each application requires additional memory and CPU resources in the host server, there are savings in hardware resource allocation that are realized by embodiments of the present disclosure. One marked change from conventional attempts is that of reserving CPU resources for a PPE (e.g., PPE 320) from the host server (e.g., host server 305) to serve all vSwitches (e.g., vSwitches 310a-310c).

Memory usage in the host server is made more efficient by having all vSwitches deployed in a single vSwitch application 340. Since the vSwitches are deployed within the same application, memory resources are shared among all vSwitches and therefore memory copying can be avoided when data packets are forwarded between the vSwitches. Further, no additional vSwitch application is required when a new vSwitch is added, but rather a new vSwitch simply requires a new independent set of Pipeline tables and a OF Client to be instantiated on the running vSwitch application 340.

In the event that a fast table is supported in a vSwitch, each vSwitch 310a-310c needs to have its own fast table (not shown). A fast table is used to increase the efficiency of a PPE. With a fast table, a table entry is generated when a packet from a new data flow is received, the entry contains all steps for packet processing. Using a signature of the header, a match is performed for the table via a hashing algorithm. Therefore, based on matching entry in the fast table, the actions configured in the flow tables can be derived by the PPE and applied to all of packets received from the same flow in an efficient way. Similar to the OpenFlow tables and the OF Client, each vSwitch will have an independent fast table within the vSwitch application.

According to embodiments of the present disclosure, each vSwitch may configure its own controller(s), and instantiate the corresponding OF Client for exchanging OpenFlow messages between the particular vSwitch and the Controller 335. That is, all vSwitches in the host server 305 may share the same controller, or alternatively, individual vSwitches may be configured to use different controllers from any other vSwitch. Again, independence of vSwitches in the host server 305 is maintained.

Port Configuration for Multiple vSwitches

A number of physical ports and/or logical ports may be configured to each vSwitch on a host server, through a mapping mechanism. With embodiments of the present disclosure, all of vSwitches are running under the same application (e.g., vSwitch application 340), the physical ports and logical ports can be dynamically configured among the multiple vSwitches. Further, because the port tables of all vSwitches are under the same application, cross-checking for port configuration amongst all vSwitches can be easily implemented which would avoid unnecessary human error during the configuration. Therefore, the system may automatically check for a conflict for configuring a port into a specific vSwitch. Port configuration commands (e.g., command instructions) can be supported through a user interface, such as a command line interface (CLI), graphical user interface (GUI), or other programmatic interface. While a CLI command example is used in the description herein, it should be understood that other forms of receiving instructions (e.g., GUI) are consistent with the spirit and scope of the present disclosure. The port configuration commands can be input at a remote system and received by the host server via, for example, through Telnet or SSH. The port configuration commands can be input locally as well, that is, through a serial port at the host server.

Figure 4:
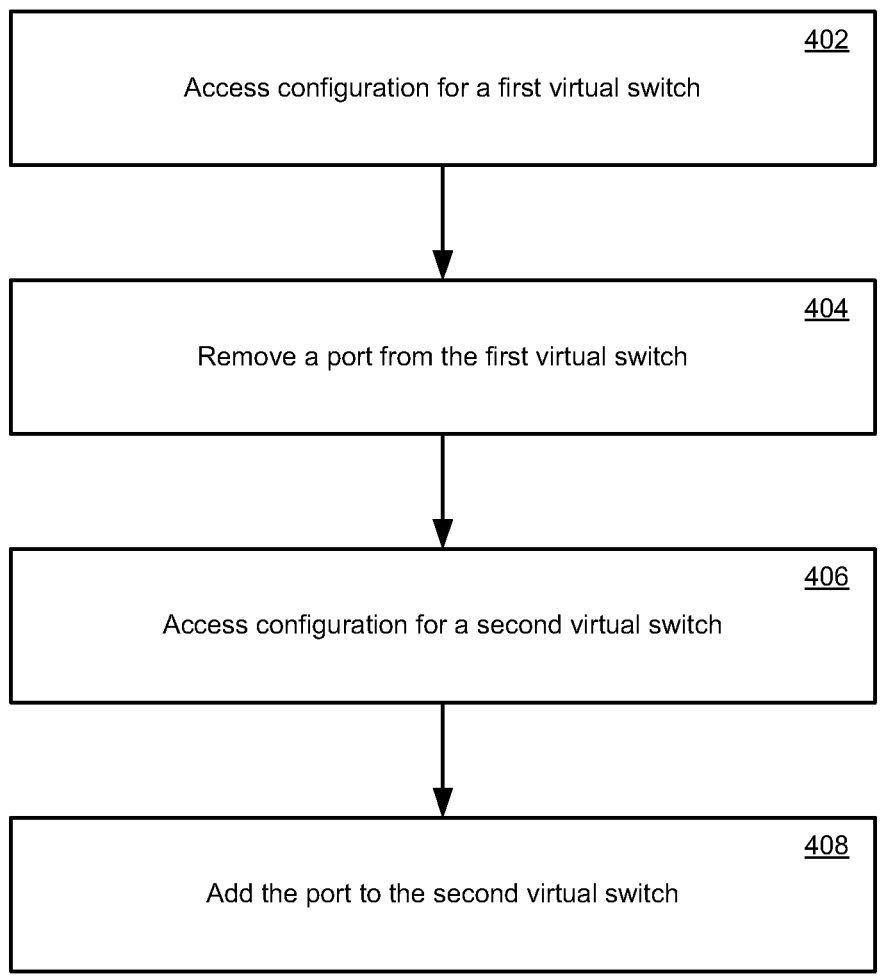
FIG. 4 is a flowchart illustrating an exemplary port configuration process for moving a port from a first vSwitch to a second vSwitch, in accordance with an embodiment of the present disclosure.

FIG. 4 is a flowchart illustrating an exemplary process 400 for removing a port from a first vSwitch and adding it into a second vSwitch, according to embodiments of the present disclosure. Steps 402-408 describe exemplary steps comprising the process depicted in flowchart 400 in accordance with the various embodiments herein described. In one embodiment, the flowchart 400 is implemented as computer-executable instructions stored in a computer-readable medium and performed by a computing device executing a process for configuring ports in a host server. Process 400 is able to be performed during runtime of the vSwitch application.

At step 402 a configuration of the first vSwitch is accessed. According to embodiments of the present disclosure, the vSwitch is one of multiple vSwitches on a host server, where all of the vSwitches are included in one vSwitch application (e.g., vSwitch 310*a* of vSwitch application 340, on a host server 305). The configuration information of the vSwitch may include several ports of the host server that have been associated with this vSwitch. Ports may be physical or logical (e.g., virtual) ports.

At step 404 a port is selected for removal from the first vSwitch accessed at step 402. The port removed had previously been assigned to the vSwitch, such that data packets received at the port would be processed according to the Pipeline Tables configured on the first vSwitch (e.g., according to the flow tables defined for that vSwitch). According to embodiments of the present disclosure each port of the virtual network is assigned to only one datapath (e.g., vSwitch). A port may be removed from a vSwitch if, for example, that port is no longer required on the vSwitch.

At step 406 a configuration of the second vSwitch of the vSwitch application is accessed. The second vSwitch is one of the multiple vSwitches included on the same vSwitch application (e.g., vSwitch 310*b* of the vSwitch application 340).

At step 408 the port is added to the configuration of the second vSwitch, such that packets received at the port will be processed according to the pipeline tables configured on the second vSwitch. As described herein, the removal of the port from the first vSwitch, along with the addition of the port to the second vSwitch, provides a means of dynamically configuring the ports among vSwitches. That is, during runtime of the vSwitch application, one or more ports are able to be removed and added from/to vSwitches of the application.

FIG. 5 is a CLI command instruction 500 of a datapath table in accordance with an embodiment of the present disclosure. As a non-limiting example, an administrator may use command line interface (CLI) commands to generate new vSwitches on the host server, e.g., to generate datapaths. The datapath table of layout diagram 500 includes a datapath index 502, datapath name 504, and datapath ID 506.

CLI command instruction 500 includes the command "datapath add dp1 0x11," which is an exemplary command for adding a new datapath to the host server. The datapath is named as "dp1" with a unique datapath ID "0x11." This syntax is exemplary, and other syntax is consistent with the spirit and scope of the present disclosure. Likewise, other modalities (e.g., a graphical user interface) are possible for providing functionality to configure multiple datapaths as disclosed herein. Typically communication protocols (e.g., OpenFlow Protocol) require that each datapath has a unique ID. As shown in FIG. 5, each datapath is configured with a unique identifier.

When the vSwitch application is started at runtime a default datapath is generated (e.g., named "default"). In the case where there is just one vSwitch, only one datapath is required. However, adding additional vSwitches requires configuration of additional datapaths. According to embodiments of the present disclosure, adding vSwitches does not require additional programming memory, or CPU core allocation, because vSwitches are added to the existing application. That is, all vSwitches are running on one application (e.g., vSwitches 310*a*-310*c* running on vSwitch application 340 of FIG. 3).

Each vSwitch must be configured with at least one port (physical or logical) in order to send and receive data packets over the vSwitch. FIG. 6 is a CLI command instruction 600 of a port mapping table for creating logical ports in accordance with an embodiment of the present disclosure.

The CLI command instruction 600 includes a port index 602, port name 604, port type 606, and port peer-ID 608. The port mapping table further includes datapath information indicating to which datapath a respective port is associated. Following generation of logical ports, but prior to mapping, the datapath information is blank (as shown in FIG. 6). In this case, the ports are not assigned to any vSwitch.

CLI command instruction 600 includes the command "port create virtual switch Iport1," which is an exemplary command for creating a new logical port (a virtual switch port), the logical port having the name "Iport1" and the type "virtual switch." As above, this syntax is exemplary only, other syntax being consistent with the spirit and scope of the present disclosure. Likewise, other modalities (e.g., a graphical user interface) are possible for providing functionality to generate logical ports as disclosed herein. Layout table 600, showing ports of the host server, includes physical ports (e.g., eth2) as well as generated logical ports (e.g., Iport1). On the host server, the number of physical ports is limited by the hardware interfaces and the number of logical ports is limited by the size of the port mapping table of vSwitch application.

Figure 7:
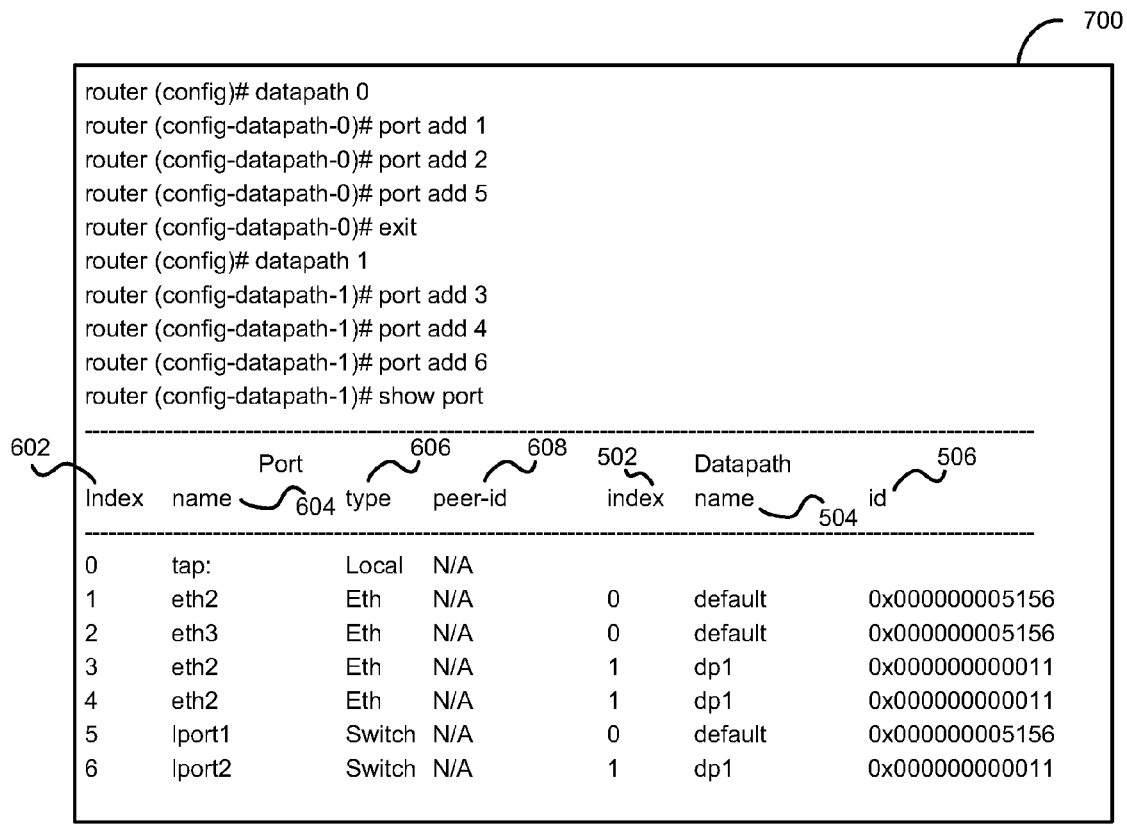
FIG. 7 depicts a command instruction for generating mapping between a port and a datapath, in accordance with an embodiment of the present disclosure.

CLI command instruction 600 displays generating new logical ports only, which are not yet configured to any specific vSwitch. FIG. 7 is a CLI command instruction 700 of configuring physical and logical ports to designated vSwitches in accordance with an embodiment of the present disclosure. According to embodiments described herein, ports may be dynamically configured for each datapath (e.g., vSwitch) on the host server. CLI command instruction 700 includes command "datapath 0," which opens configuration of the "default" datapath (e.g., datapath 0). The command "port add 1" adds port 1 (e.g., "eth2") to datapath 0. Likewise, commands "port add 2" and "port add 5," add ports 2 and 5 to datapath 0. An "exit" command exits the configuration from datapath 0, and following command "datapath 1" enters configuration of "dp1" datapath (e.g., datapath 1). Subsequently, ports 3, 4, and 6 are added to datapath1 in a similar manner as above. A "show port" command shows the port mapping table, which is now updated with the datapath information of the port mapping.

During runtime, a port may be reconfigured from one vSwitch to another as described herein. Using CLI command instruction 700 as an example, assume a network administrator desires to transfer port 6 (e.g., "Iport2") from datapath 0 to datapath 1. Using, for example, the CLI commands, the administrator is able to enter the configuration of datapath 0, and to then remove Iport2. The administrator will then exit configuration of datapath 0, and enter the configuration of datapath 1. Once in datapath 1 configuration, Iport2 can be added to the datapath 1. If an attempt is made to add Iport2 to datapath 1 prior to its removal from datapath 0, an error message occurs notifying of (current) configuration of Iport2 with datapath 0. Therefore a capability of conflict resolution is provided by embodiments of the present disclosure, as visibility exists for a network administrator into port mapping, as well as the ability to dynamically allocate ports amongst available vSwitches in the host server.

Figure 8:
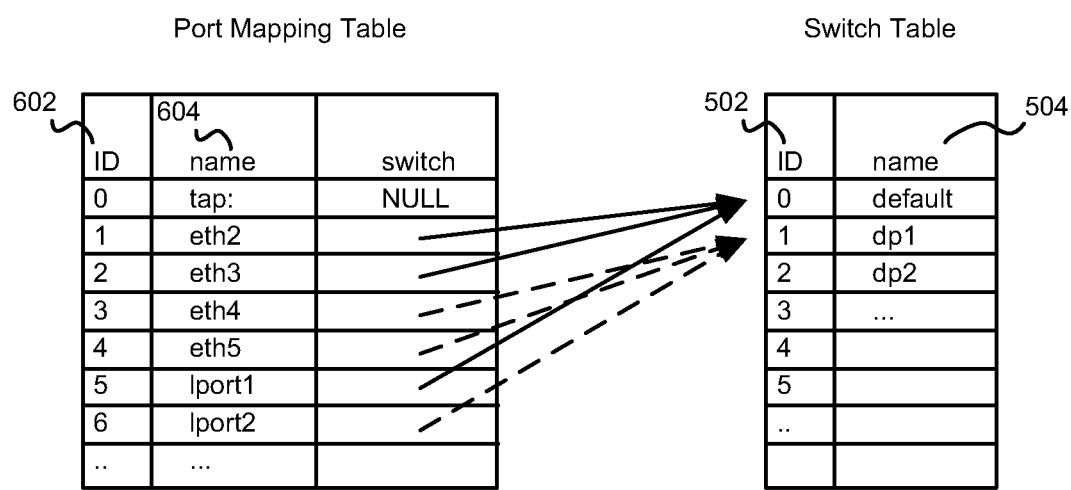
FIG. 8 is a diagram of a port mapping table depicting a mapping between a port mapping table and a switch table, in accordance with an embodiment of the present disclosure.

FIG. 8 is a diagram of a dynamic configuration of a port mapping table in accordance with an embodiment of the present disclosure. FIG. 8 includes a port mapping table with port ID 602, port name 604, and the switch to which a port is assigned. Further, a switch table is shown, having switch ID 502 and switch name 504. Solid arrows depict the result of the mapping described in FIG. 7, particularly the mapping of ports 1, 2, and 5 to datapath 0 ("default"). Dashed arrows show the mapping of ports 3, 4, and 6 to datapath 1 ("dp1").

Figure 9:
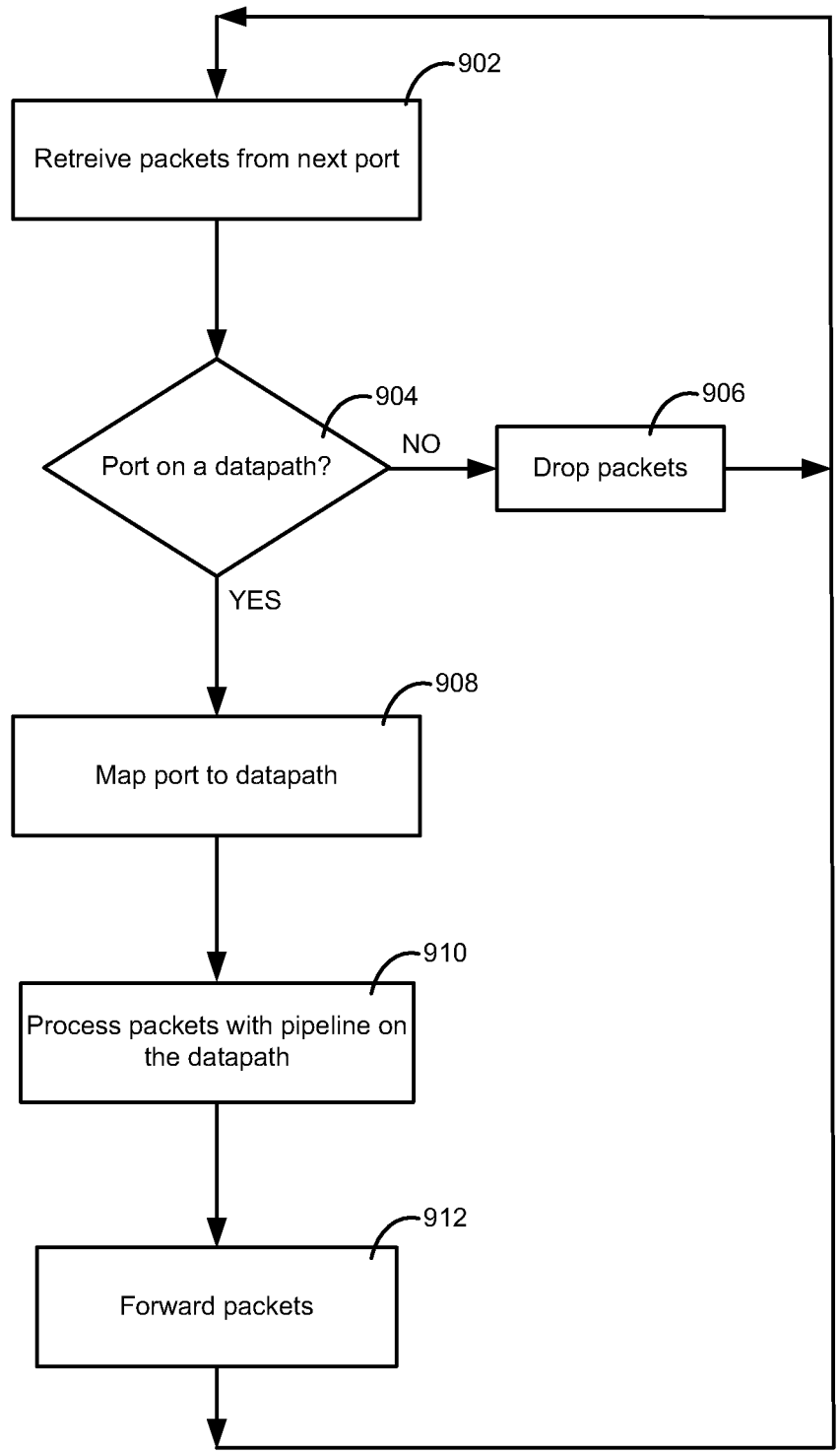
FIG. 9 is a flowchart of packet processing of a Packet Processing Engine (PPE) in accordance with an embodiment of the present disclosure.

FIG. 9 is a flowchart of packet processing of a PPE (Packet Processing Engine) 900 in accordance with an embodiment of the present disclosure. Steps 902-912 describe exemplary steps comprising the process depicted in flowchart 900 in accordance with the various embodiments herein described. In one embodiment, the flowchart 900 is implemented as computer-executable instructions stored in a computer-readable medium and performed by a computing device executing a process for forwarding data packets in a vSwitch. In an embodiment flowchart 900 depicts a polling mode of a packet processing process, where polling occurs for packets on each port of a host server. For example, all available ports may be included in a table, and polling ports for packets may be executed continuously.

Current attempts to poll ports for receiving data packets assume the polled ports are allocated for one datapath, because a conventional vSwitch application only supports one vSwitch. However, embodiments of the present disclosure enable simultaneous operation of multiple vSwitches on the same application program in a host server, and therefore multiple datapaths are possible. This means that when a data packet is received at a port, a system as described herein will attempt to match the port to a datapath—that is, to determine which vSwitch is responsible to process the received packets from the currently polled port. It should be noted that flow tables (e.g., OpenFlow tables) of the vSwitch need to be configured prior to polling ports for packets, so that the appropriate rules can be applied to the received data packets on the vSwitch.

At step 902 of process 900, data packets are received at a port on the host server. The port may be any port available on the host server, that is, a physical port (e.g., Ethernet port) or any port that can be identified for the vSwitch application (via, for example, logical port generation as described in FIG. 6).

At step 904, a determination is made of whether the currently polled port is associated with a datapath. If NO, the received data packets at the currently polled port are dropped in a step 906. If YES, the port is associated with a datapath and the process continues to step 908.

At step 908 the port is mapped to a particular datapath (e.g., a vSwitch) in the host server. This step differs from a polling process in a conventional system, because polling of ports is done on a per-datapath basis, due to an independent application being present for each distinct vSwitch. Since according to embodiments presented herein multiple vSwitches may be present in one vSwitch application, the datapath is obtained according to the port mapping table based on the current polled port. Therefore the pipeline tables of the particular vSwitch (e.g., vSwitch 310*a*) is determined for packet processing purpose at step 908.

At step 910, the received data packets are processed according to the pipeline tables configured on the datapath. That is, a pointer will point to the set of flow tables (e.g., OpenFlow tables) of the particular vSwitch determined at step 908, and packet processing will be performed according to the specific rule(s) of those flow tables. This processing may include header modification, header insertion and/or removal, and other common actions in a vSwitch. At step 912, the packet(s) are forwarded at the specified port according to OpenFlow table of the vSwitch. The process 900 then repeats, with retrieval of packets at a next port beginning again at step 902.

Figure 10:
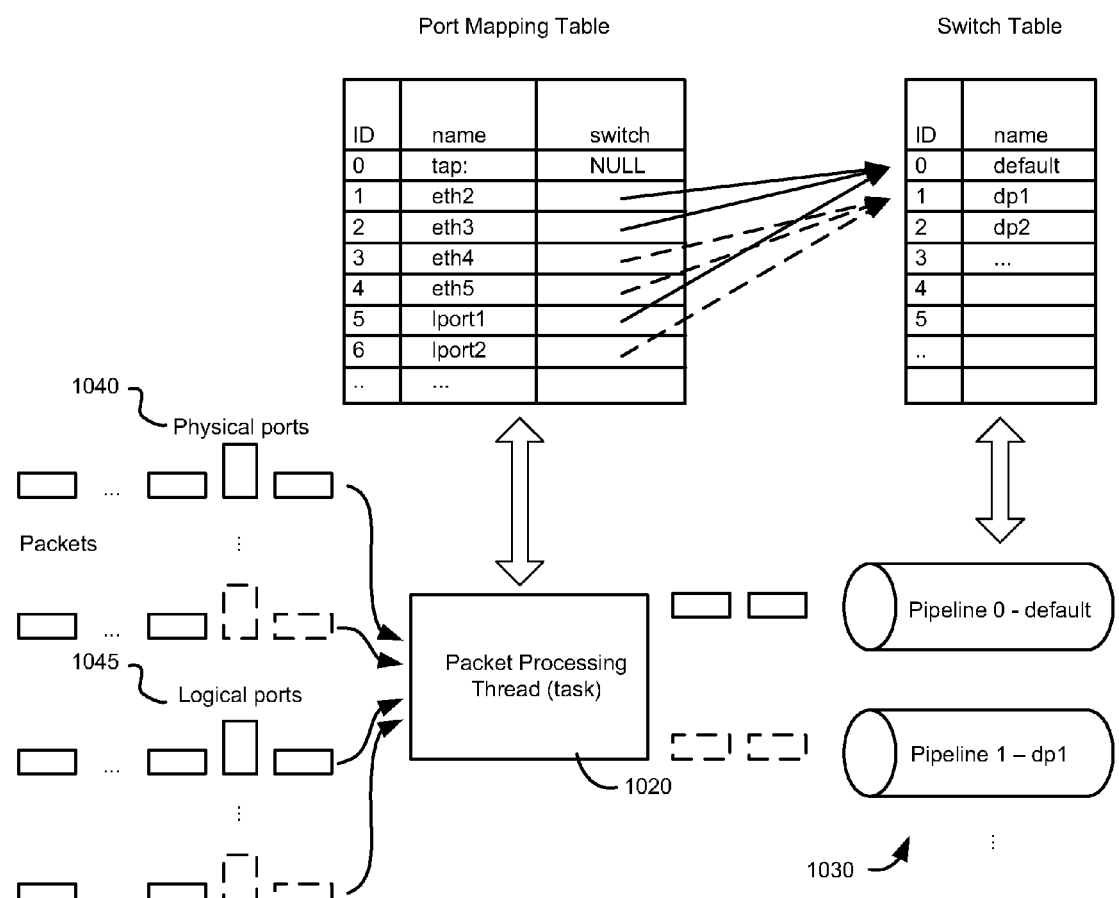
FIG. 10 is a diagram of an exemplary data packet processing in accordance with an embodiment of the present disclosure.

FIG. 10 is a diagram of an exemplary data packet process in accordance with an embodiment of the present disclosure. The diagram illustrates data packets received at physical ports 1040 and logical (e.g., virtual) ports 1045. The data packets are processed by a PPE thread 1020 (e.g., a thread of PPE 320), which processes the packets according to a pipeline 1030 of datapaths (e.g., "default", "dp1") associated with the receiving ports. According to FIG. 10, data packets received at ports configured to datapath "default" are depicted with a solid line, while those received at ports configured for datapath "dp1" are depicted with a dashed line. Packets received at the ports are mapped to the corresponding datapath pipeline by PPE thread 1020, and then the packets are processed according to the flow tables associated with the pipeline. A port, once added to a vSwitch (e.g., a datapath), will have all received packets processed according to the flow tables of that vSwitch. There is thus a mapping between a port and the rule(s) to process the packet(s) received at the port. If a port is not configured to any datapath, packets received at the port will be dropped because there is no rule for processing those packets.

As described herein, a port can be configured by an administrator to be associated with a particular vSwitch, using for example CLI commands as shown in FIG. 5-7. FIG. 10 shows an exemplary port mapping table and switch table, with solid arrows depicting those ports mapped to the datapath 0 vSwitch ("default") and dashed arrows depicting those ports mapped to the datapath 1 vSwitch ("dp1"). As described herein, ports may be configured dynamically to be associated with a vSwitch, or to be removed from the first vSwitch and added to the second vSwitch.

Figure 11:
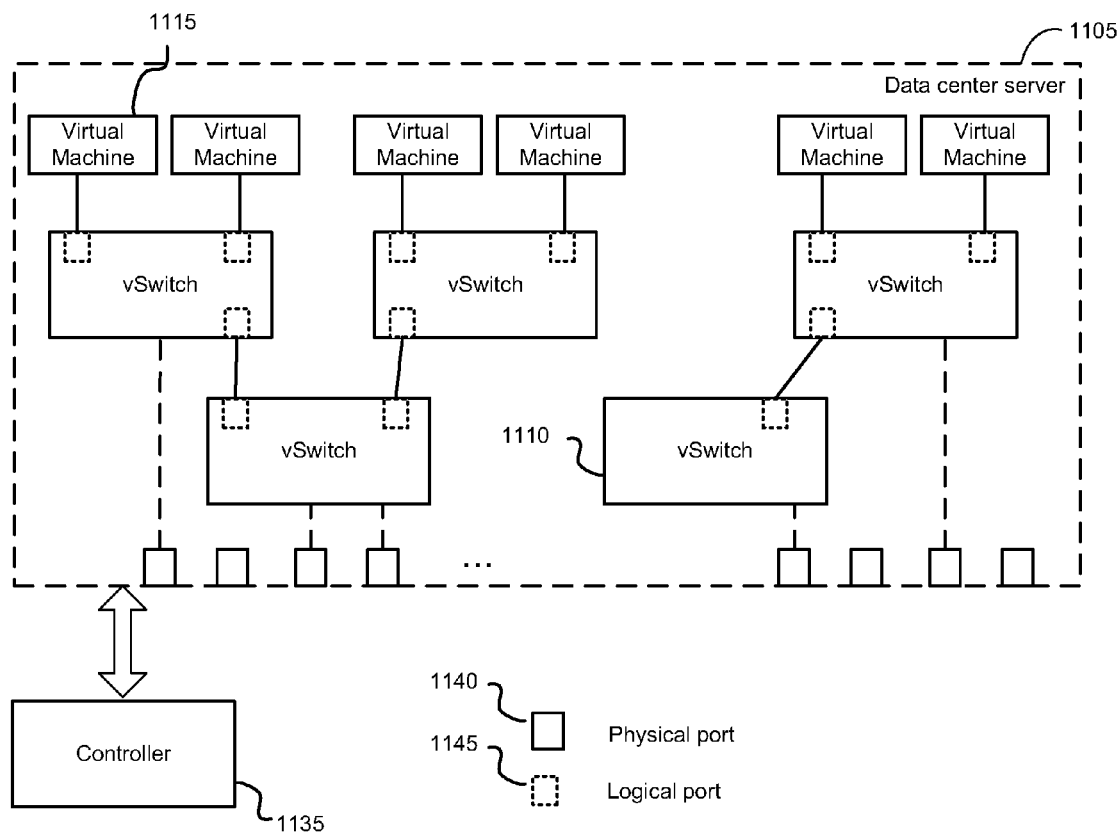
FIG. 11 is a block diagram illustrating a data center server with multiple vSwitches in accordance with an embodiment of the present disclosure.

FIG. 11 is a block diagram illustrating a configuration of multiple VMs 1115 and vSwitches 1110 on a single host server 1105 in accordance with an embodiment of the present disclosure. A controller 1135 is in communication with the vSwitches 1110. The host server 1105 has a number of ports, including physical ports 1140 and logical ports 1145. Physical ports 1140 are depicts with a solid rectangle, while logical ports 1145 are depicted with a dashed rectangle. According to embodiments of the present disclosure, all of the vSwitches 1110 deployed and supported under one vSwitch application (e.g., vSwitch application 340) on the host server 1105. VMs 1115 are connected through logical port(s) to vSwitch(es) 1110 on the host server, where each port may have only one connection. Further, one vSwitch may be connected to another vSwitch via logical ports.

Figure 12:
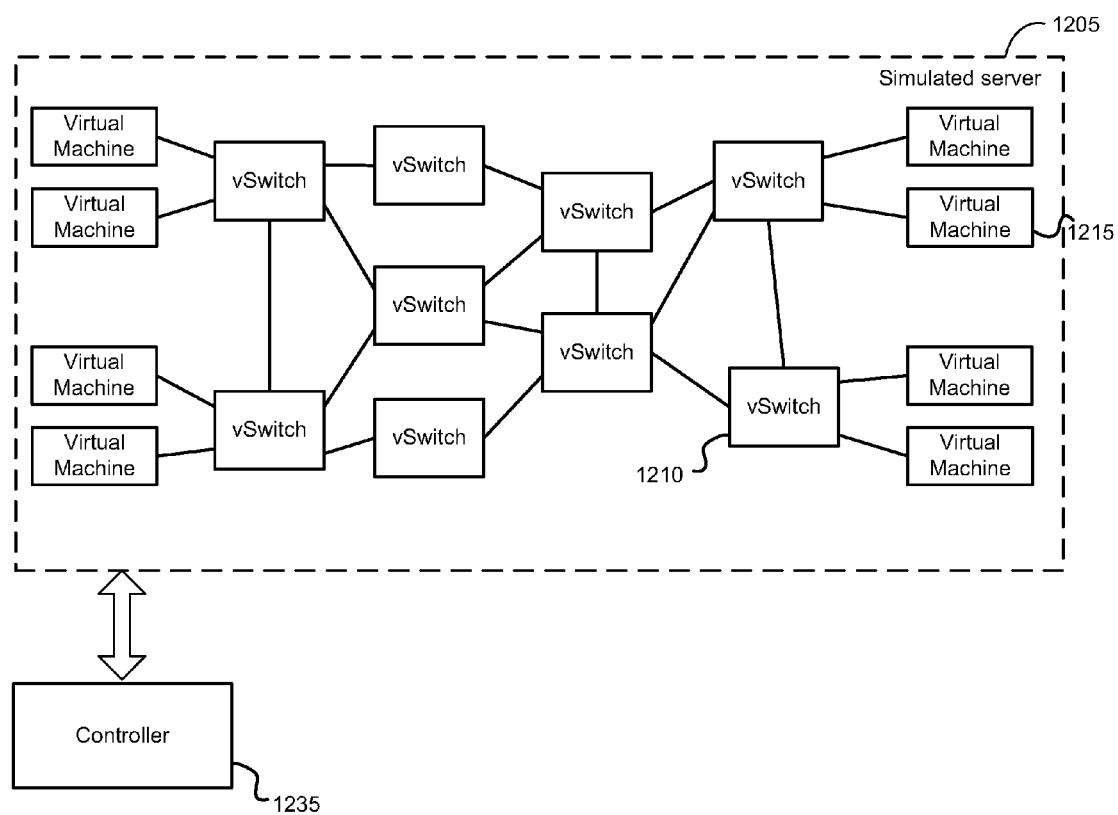
FIG. 12 is a block diagram illustrating a simulation of a software-defined network deployed on a single host server, in accordance with an embodiment of the present disclosure.

FIG. 12 is a block diagram illustrating a simulation of an SDN network on a single host server 1205 in accordance with an embodiment of the present disclosure. The simulation depicted in FIG. 12 includes multiple VMs 1215, and multiple vSwitches (vSwitches) 1210. Under this configuration, the functionality of an SDN network can be simulated and tested on a single host. The controller 1235 may send configuration messages to the deployed vSwitches 1210 to setup different routing paths from one end to the other. The controller 1235 may also dynamically change the routing path on a number of vSwitches 1210 when an existing connection is disconnected. The packet-in and packet-out message exchange between the controller 1235 and vSwitches 1210 can also be verified under such configuration.

Exemplary Computing System

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be database servers, storage devices, desktop computer systems, portable computer systems, handheld devices, networking devices or any other device that incorporates hard-wired and/or program logic to implement the techniques.

Figure 13:
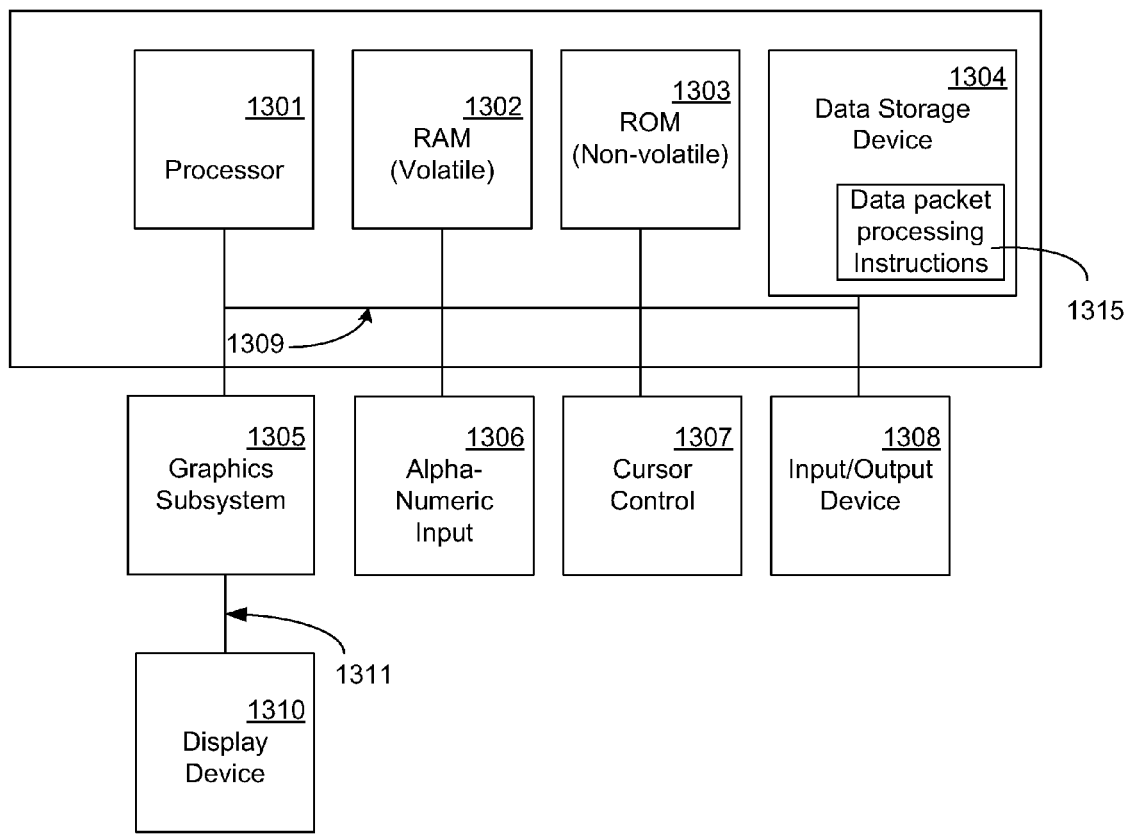
FIG. 13 is a block diagram illustrating an exemplary computer system, with which embodiments of the present disclosure may be implemented.

FIG. 13 illustrates an exemplary configuration of an apparatus 1300 in accordance with various embodiments of the present disclosure. The exemplary system 1300 upon which embodiments of the present invention may be implemented includes a general purpose computing system environment. In its most basic configuration, computing system 1300 typically includes at least one processing unit 1301 and memory, and an address/data bus 1309 (or other interface) for communicating information. Depending on the exact configuration and type of computing system environment, memory may be volatile (such as RAM 1302), non-volatile (such as ROM 1303, flash memory, etc.) or some combination of the two.

Computer system 1300 may also comprise an optional graphics subsystem 1305 for presenting information to the computer user, e.g., by displaying information on an attached display device 1310, connected by a video cable 1311. According to embodiments of the present disclosure, the graphics subsystem 1305 may be coupled directly to the display device 1310 through the video cable 1311. In alternate embodiments, display device 1310 may be integrated into the computing system (e.g., a laptop or netbook display panel) and will not require a video cable 1311.

Additionally, computing system 1300 may also have additional features/functionality. For example, computing system 1300 may also include additional storage media (removable and/or non-removable) including, but not limited to, magnetic or optical disks or tape. Such additional storage is illustrated in FIG. 13 by data storage device 1304. Computer storage media includes volatile and nonvolatile, removable and non-removable media implemented in any method or technology for storage of information such as computer readable instructions, data structures, program modules or other data. RAM 1302, ROM 1303, and data storage device 1304 are all examples of computer storage media. Data storage device 1304 may include data packet processing instructions 1315, which comprise software that is executable by a processor (e.g. 1301) to impart the computing system 1300 with some or all of the functionality described herein.

Computer system 1300 also comprises an optional alphanumeric input device 1306, an optional cursor control or directing device 1307, and one or more signal communication interfaces (input/output devices, e.g., a network interface card, a transmitter and receiver, also called a "transceiver") 1308. Optional alphanumeric input device 1306 can communicate information and command selections to central processor 1301. Optional cursor control or directing device 1307 is coupled to bus 1309 for communicating user input information and command selections to central processor 1301. Signal communication interface (input/output device) 1308, also coupled to bus 1309, can be a serial port. Communication interface 1308 may also include wireless communication mechanisms. Using communication interface 1308, computer system 1300 can be communicatively coupled to other computer systems over a communication network such as the Internet, a software defined network (SDN), or an intranet (e.g., a local area network), or can receive data (e.g., a digital television signal).

In the foregoing detailed description of embodiments of the present invention, numerous specific details have been set forth in order to provide a thorough understanding of the present invention. However, it will be recognized by one of ordinary skill in the art that the present invention is able to be practiced without these specific details. In other instances, well-known methods, procedures, components, and circuits have not been described in detail so as not to unnecessarily obscure aspects of the embodiments of the present invention. Although a method is able to be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part.

Embodiments according to the present disclosure are thus described. While the present disclosure has been described in particular embodiments, it is intended that the invention shall be limited only to the extent required by the appended claims and the rules and principles of applicable law.

What is claimed is:

1. An apparatus comprising:
   a user interface configured to receive instructions for generating a vSwitch application;
   a memory communicatively coupled to the user interface and configured to store the instructions; and
   a processor communicatively coupled to the user interface and to the memory and configured to execute the instructions to cause the processor to generate the vSwitch application, the vSwitch application comprising a plurality of vSwitches, the plurality of vSwitches implementing a flow table and a protocol, and to cause the processor to dynamically allocate a set of packet processing engine (PPE) threads of the processor to the vSwitch application according to network traffic received at the plurality of vSwitches of the vSwitch application, the set of PPE threads for processing data packets on behalf of all vSwitches of the plurality of vSwitches hosted on the apparatus.

2. The apparatus according to claim 1 further comprising a plurality of ports, wherein configuration instructions received at a port of the plurality of ports cause the processor to configure the vSwitch application for management via a selected port of the plurality of ports, the management including management of any vSwitch of the plurality of vSwitches.

3. The apparatus according to claim 2, wherein the configuration instructions cause the processor to access a configuration of a first vSwitch of the plurality of vSwitches, and to associate a first port of the plurality of ports with the first vSwitch of the plurality of vSwitches.

4. The apparatus according to claim 3, wherein the configuration instructions further cause the processor to change the association of the first port of the plurality of ports, the change comprising removal of the first port of the plurality of ports from association with the first vSwitch of the plurality of vSwitches and addition of the first port of the plurality of ports to association with a second vSwitch of the plurality of vSwitches, during a runtime of the vSwitch application.

5. The apparatus according to claim 2, wherein the configuration instructions comprise generation of a logical port, the logical port belonging to the plurality of ports.

6. The apparatus according to claim 2, wherein the configuration instructions further cause the processor to increase the number of vSwitches in the plurality of vSwitches, each additional vSwitch implemented via a respective flow table and a respective protocol.

7. The apparatus according to claim 6, wherein the number of PPE threads of the set of PPE threads is unchanged.

8. The apparatus according to claim 1, wherein the processor is configured to monitor network traffic loads.

9. The apparatus according to claim 8, wherein the processor is configured to automatically load balance network traffic amongst vSwitches of the plurality of vSwitches, based upon network traffic loads.

10. The apparatus according to claim 9, wherein to automatically load balance comprises to dynamically assign threads of the set of PPE threads amongst vSwitches of the plurality of vSwitches.

11. The apparatus according to claim 1, wherein the user interface comprises a command-line-interface (CLI).

12. A method of processing data packets in a virtual network on a host server, the method comprising:
   receiving a data packet at a port of the host server, the host server including a vSwitch application comprising a plurality of vSwitches and a set of packet processing engine threads dynamically allocated to the vSwitch application according to network traffic received at the plurality of vSwitches of the vSwitch application, the set of packet processing engine threads for processing data packets on behalf of all vSwitches of the plurality of vSwitches;
   determining, using the set of packet processing engine threads, a mapping of the port to a datapath of a plurality of datapaths of the vSwitch application; and
   processing the data packet according to a flow pipeline associated with the datapath.

13. The method according to claim 12, wherein the data packet is dropped if the determining a mapping determines the port is not mapped to a datapath of the plurality of datapaths.

14. The method according to claim 13, wherein, in response to the data packet being dropped, the port is flagged for configuring.

15. The method according to claim 14, wherein the configuring comprises associating the port with a vSwitch of the plurality of vSwitches.

16. The method according to claim 12, further comprising changing the mapping of the port from the datapath to a second datapath of the plurality of datapaths for changing the topology of the virtual network.

17. A method of configuring ports for a virtual network on a host server, the method comprising:
   accessing a configuration of a vSwitch of a plurality of vSwitches implemented on a vSwitch application, the vSwitch application comprising a set of packet processing engine threads for processing data packets on behalf of all vSwitches of the plurality of vSwitches;
   dynamically allocating the set of packet processing engine threads to the vSwitch application according to network traffic received at the plurality of vSwitches of the vSwitch application; and
   associating a selected port of a plurality of ports with the vSwitch of the plurality of vSwitches, the host server comprising the plurality of ports, wherein the accessing is performed using a management interface, and wherein the accessing and associating are performed during a runtime of the vSwitch application.

18. The method according to claim 17, wherein the associating the selected port of the plurality of ports comprises removing the selected port of the plurality of ports from a first association with a first vSwitch of the plurality of vSwitches, and adding the selected port of the plurality of ports to a second association with a second vSwitch of the plurality of vSwitches.

19. The method according to claim 17, wherein the associating the selected port of the plurality of ports comprises determining if the associating the selected port of the plurality of ports causes a conflict with a current association of the selected port of the plurality of ports.

20. The method according to claim 19, further comprising generating an error message if the selected port of the plurality of ports is already associated with another vSwitch of the plurality of vSwitches.

* * * * *

UNITED STATES PATENT AND TRADEMARK OFFICE
CERTIFICATE OF CORRECTION

PATENT NO. : 9,614,789 B2
APPLICATION NO. : 14/592523
DATED : April 4, 2017
INVENTOR(S) : Zhu et al.

Page 1 of 1

It is certified that error appears in the above-identified patent and that said Letters Patent is hereby corrected as shown below:

In the Specification

In Column 7, Line 16, delete "Open Flow" and insert --OpenFlow-- therefor

Signed and Sealed this
Fourteenth Day of April, 2020

Andrei Iancu
*Director of the United States Patent and Trademark Office*